US009438959B2

(12) United States Patent
Baugus et al.

(10) Patent No.: US 9,438,959 B2
(45) Date of Patent: Sep. 6, 2016

(54) METHOD AND SYSTEM FOR WATCHING CONTENT AND PLAYING GAMES ON A MOBILE COMMUNICATION DEVICE

(75) Inventors: Carrie Baugus, Atlanta, GA (US); Sherri Glass, Atlanta, GA (US); Christopher Waldron, Stone Mountain, GA (US); James Wentzel, Atlanta, GA (US); Alan Moore, Decatur, GA (US); Christine Veith, Atlanta, GA (US); Beau Teague, Marietta, GA (US); Jaclyn Cannon, Atlanta, GA (US); Randall Coston, Atlanta, GA (US); Mario Piedra, Atlanta, GA (US); Paul Condolora, Atlanta, GA (US); Jason Nunes, Brooklyn, NY (US); Frederick Kahl, Brooklyn, NY (US); Andrew Pratt, Brooklyn, NY (US); Kristin Elllington, New York, NY (US); Chad Fuller, Atlanta, GA (US); Kenneth Bunch, Atlanta, GA (US)

(73) Assignee: TURNER BROADCASTING SYSTEM, INC., Atlanta, GA (US)

(*) Notice: Subject to any disclaimer, the term of this patent is extended or adjusted under 35 U.S.C. 154(b) by 820 days.

(21) Appl. No.: 13/523,515

(22) Filed: Jun. 14, 2012

(65) Prior Publication Data
US 2013/0337917 A1 Dec. 19, 2013

(51) Int. Cl.
*G09G 5/10* (2006.01)
*H04N 21/478* (2011.01)
*A63F 13/211* (2014.01)
*A63F 13/2145* (2014.01)
*A63F 13/92* (2014.01)

(52) U.S. Cl.
CPC ........ *H04N 21/4781* (2013.01); *A63F 13/211* (2014.09); *A63F 13/2145* (2014.09); *A63F 13/92* (2014.09)

(58) Field of Classification Search
None
See application file for complete search history.

(56) References Cited

U.S. PATENT DOCUMENTS

| 8,810,512 B2* | 8/2014 | Andersson et al. ........... 345/158 |
| 2007/0078009 A1* | 4/2007 | Lockton et al. ................ 463/43 |
| 2009/0300143 A1* | 12/2009 | Musa ................. H04N 7/17318 709/218 |
| 2013/0222597 A1* | 8/2013 | Brink et al. .................. 348/157 |

* cited by examiner

*Primary Examiner* — Xiao Wu
*Assistant Examiner* — Mohammad H Akhavannik
(74) *Attorney, Agent, or Firm* — Chip Law Group

(57) ABSTRACT

A method and system for watching video and playing games in a mobile communication device are described in which video content is received from a network television channel and, based on the orientation of the mobile communication device and the device type, the video content and/or a game may be displayed. When in a portrait orientation, the operating mode may be such that the video content and/or the game may be displayed. For a tablet device in a portrait orientation, for example, both the video content and the game may be displayed. When the mobile communication device is changed to a landscape orientation, the operating mode may be different and only one of the video content and the game may be displayed based on whether the mobile communication device was rotated clockwise or counterclockwise. A rewards program may combine the video-watching and game-playing activities of the user.

39 Claims, 11 Drawing Sheets

METHOD AND SYSTEM FOR WATCHING
CONTENT AND PLAYING GAMES ON A
MOBILE COMMUNICATION DEVICE

CROSS-REFERENCE TO RELATED
APPLICATIONS/INCORPORATION BY
REFERENCE

Not Applicable.

FIELD OF TECHNOLOGY

Certain embodiments of the invention relate to applications for mobile communication devices. More specifically, certain embodiments of the invention relate to a method and system for watching content and playing games on a mobile communication device.

BACKGROUND

The increased computational capability of mobile communication devices makes them a convenient and effective platform on which to perform multiple functions or operations that may be of interest to a user.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

A system and/or method is provided for watching content and playing games on a mobile communication device, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF
THE DRAWINGS

DETAILED DESCRIPTION OF THE
DISCLOSURE

Certain embodiments of the invention may be found in a method and system for watching content and playing games on a mobile communication device. Various embodiments of the invention provide for a mobile communication device in which video content is received from a network television channel. For example, different programs or shows may be received by the mobile communication device from the network television channel. An application running on the mobile communication device may be utilized to display the video content received from the network television channel and/or to display a game selected from multiple games supported by the application. A user of the mobile communication device may interact with the application to select which game the user may want to play and/or to select the program or show the user may want to watch.

When the application is running, the mobile communication device may operate in one of multiple modes based on the orientation of the mobile communication device and on the device type. In an exemplary embodiment of the invention, when the mobile communication device is in a portrait orientation, the operating mode may be such that one or both of the video content and the game are displayed for user consumption. For a tablet device in a portrait orientation, for example, the larger screen allows for both the video content and the game to be displayed such that the user may watch the video content and interact with the game concurrently. For a smartphone, for example, the smaller screen is such that only the game or only the video content is displayed when in a portrait orientation.

When the mobile communication device is changed to a landscape orientation, the operating mode may be different and only one of the video content and the game may be displayed. Whether the video content or the game is displayed may depend on whether the mobile communication device was rotated clockwise or counter-clockwise when changed to the landscape orientation. By changing the mobile communication device orientation, the operating mode of the mobile communication device may change accordingly.

Figure 1:
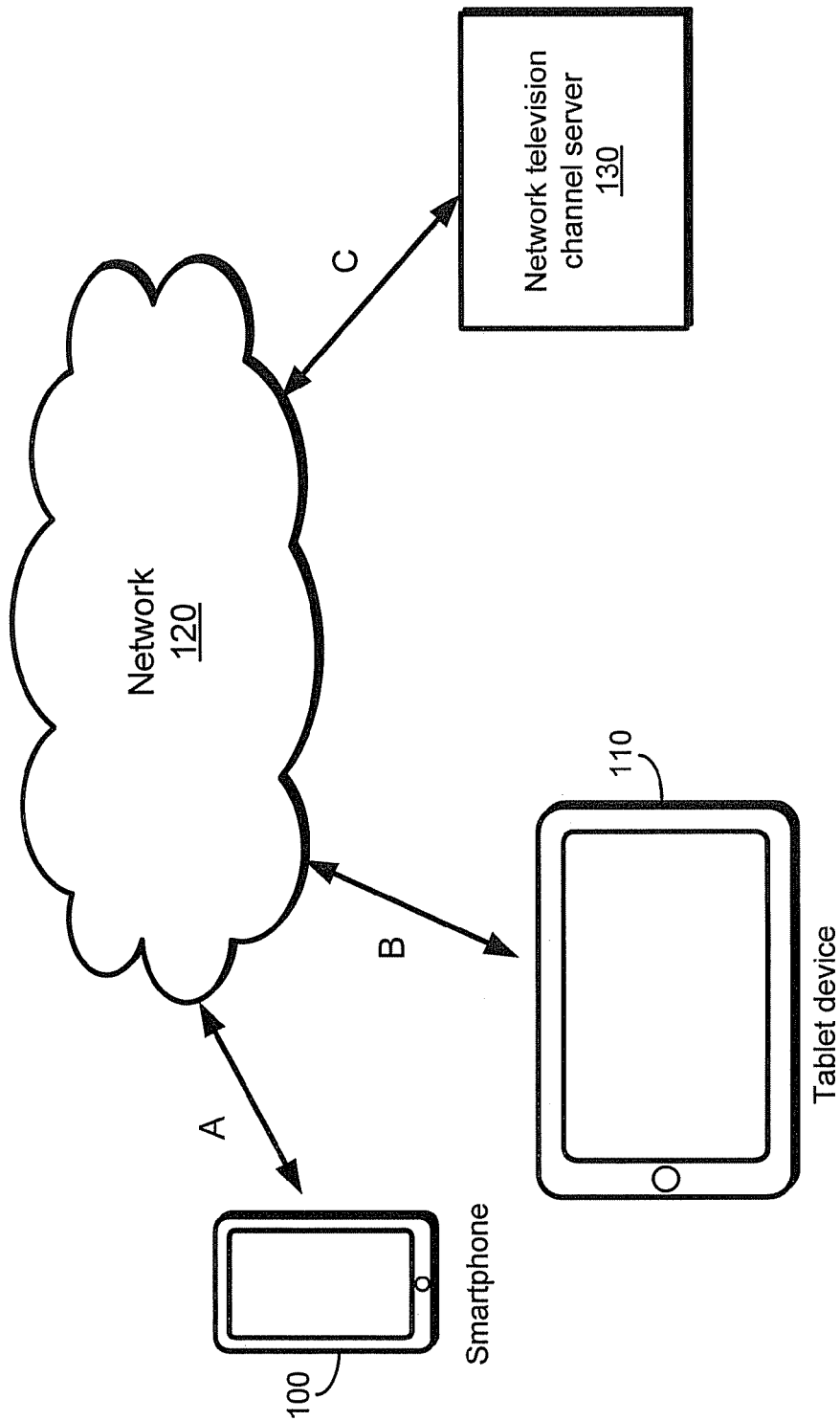
FIG. 1 is a diagram that illustrates an exemplary high-level system for watching content and playing games on a mobile communication device, in accordance with an embodiment of the invention.

FIG. 1 is a diagram that illustrates an exemplary high-level system for watching content and playing games in a mobile communication device, in accordance with an embodiment of the invention. Referring to FIG. 1, there is shown a first mobile communication device 100 (e.g., smartphone), a second mobile communication device 110 (e.g., tablet device), a network 120, and a network television channel 130.

The mobile communication devices 100 and 110 may comprise suitable logic, circuitry, code, and/or interfaces that may be operable to communicate with the network 120. For example, the mobile communication device 100 may communicate with the network 120 via a link A while the mobile communication device 110 may communicate with the network 120 via a link B. The mobile communication devices 100 and 110 may also communicate with the network television channel server 130 through the network 120 and link C.

The mobile communication devices 100 and 110 may be operable to download and store an application that enables the devices to play games and to watch video content provided by the network television channel server 130 or from another like system. In this regard, the application may be referred to as a watch-and-play application. The application may comprise multiple games for user interaction and the user may select one of the games to play. Moreover, the application may enable the user to select that the user may want to watch from various options provided by the network television channel server 130.

The application may support multiple operating modes for the mobile communication device based on the orientation of the mobile communication device and the type of mobile communication device. For example, for a smartphone, there may be two operating modes: a first operating mode corresponding to a portrait orientation; and a second operating mode corresponding to a landscape orientation. The smartphone may display the game for user interaction when in the first operating mode. On the other hand, the smartphone may display the video content provided by the network television channel server 130 when in the second operating mode. In another embodiment of the invention, the operating modes of a smartphone may be such that the video content is displayed when in the first operating mode and the game is displayed when in the second operating mode. The smartphone may change from one operating mode to the other operating mode by rotating from one orientation to the other orientation.

In another example, a tablet device may have three operating modes: a first operating mode corresponding to a portrait orientation; a second operating mode corresponding to a landscape orientation after a clockwise rotation; and a third operating mode corresponding to a landscape orientation after a counter-clockwise rotation. The tablet device may display both the game and the video content when in the first operating mode. The tablet device may display the video content provided by the network television channel server 130 when in the second operating mode and the game when in the third operating mode. In another embodiment of the invention, the tablet device may display the video content provided by the network television channel server 130 when in the third operating mode and the game when in the second operating mode. The tablet device may change between operating modes by changing its orientation.

The network 120 may comprise suitable logic, circuitry, code, and/or interfaces that may be operable to communicate with the mobile communication devices 100 and 110, and with the network television channel server 130. In some embodiments of the invention, portions of the network 120 may support wireless communication and other portions may support wired communication. The network 120 may be operable to wirelessly communicate with the mobile communication devices 100 and 110 via links A and B, respectively. Link C, which may be utilized for communication with the network television channel server 130, may be a wired link, a wireless link, or a combination thereof.

The network television channel server 130 may comprise suitable logic, circuitry, code, and/or interfaces that may be operable to provide video content (e.g., programs, shows, trailers, promos) to the mobile communication devices 100 and 110 through the network 120. The network television channel server 130 may be operable to provide video content in response to a request made by a mobile communication device. The request may be generated by the application running in the mobile communication device and may be sent to the network television channel server 130 through the network 120. The request may be for a particular video content in response to a selection made based on user input. The network television channel server 130 may stream the video content to the appropriate mobile communication device; however, other methods of transferring the video content to the mobile communication device may also be utilized. The network television channel server 130 may correspond to a particular network television channel (e.g., Cartoon Network). In this regard, the watch-and-play application running on the mobile communication device may correspond to the network television channel that provides the video content.

In operation, the mobile communication device 100 or the mobile communication device 110 may download an application that enables watch-and-play operations. In some instances, the application may be a native device application and in such instances, there may be not need to download the application. Notwithstanding, the application may be downloaded through the network 120 from a server, which may or may not be the network television channel server 130. Once the application is running, and based on the operating mode of the mobile communication device, a user of the mobile communication device may be presented with video content for watching, or with a game for playing, or both. The game may be selected by the user from multiple games supported by the application. In some embodiments of the invention, the user may also select the video content that is to be received by the mobile communication device.

Figure 2:
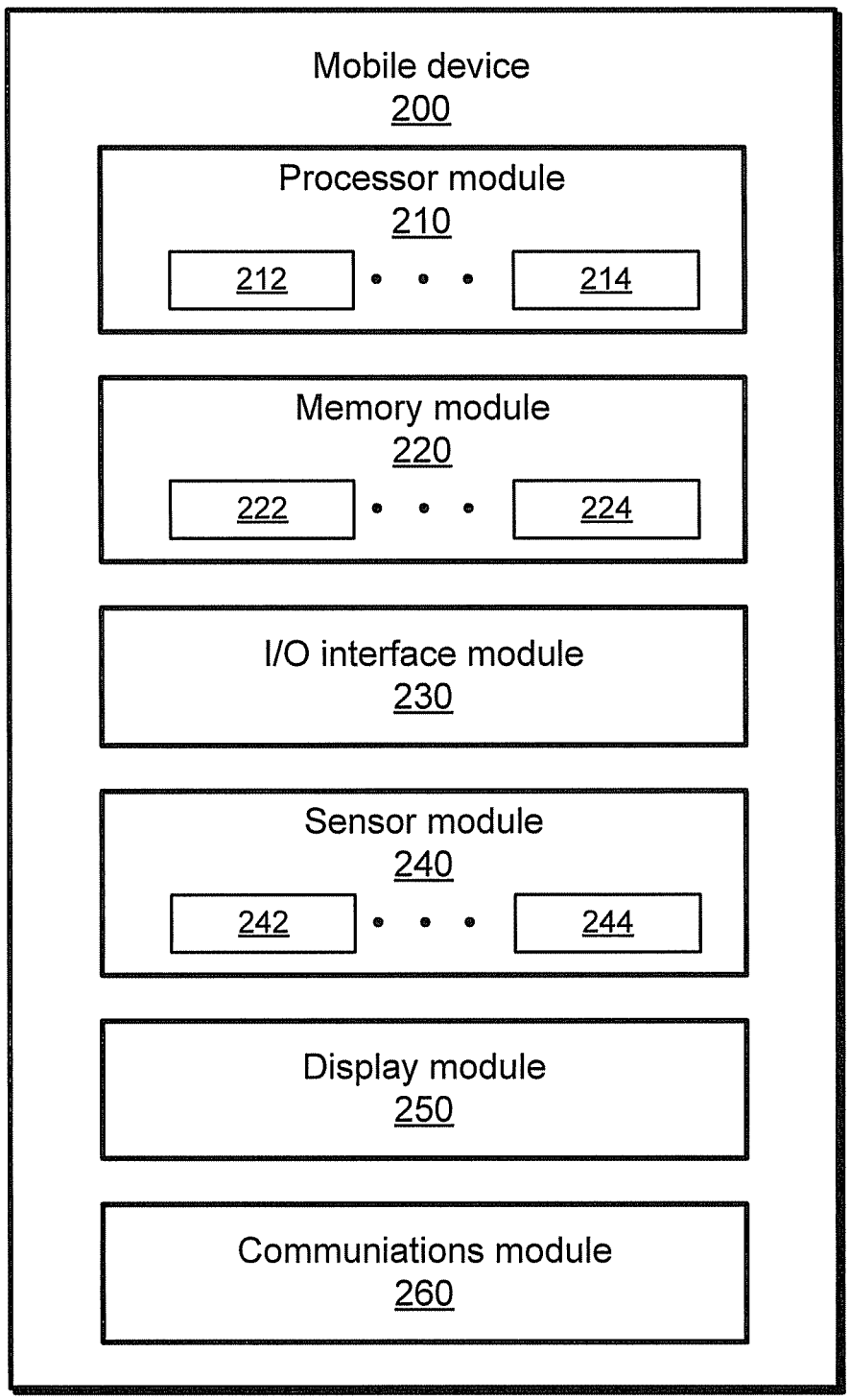
FIG. 2 is a block diagram that illustrates an exemplary architecture of a mobile communication device, in accordance with an embodiment of the invention.

FIG. 2 is a block diagram that illustrates an exemplary architecture of a mobile communication device, in accordance with an embodiment of the invention. Referring to FIG. 2, there is shown a mobile communication device 200 that may correspond to the mobile communication devices 100 and 110 described above with respect to FIG. 1. The mobile communication device 200 may comprise a processor module 210, a memory module 220, an input/output (I/O) interface module 230, a sensor module 240, a display module 250, and a communications module 260.

The processor module 210 may comprise suitable logic, circuitry, code, and/or interfaces that may be operable to run or execute a watch-and-play application that enables a user to play games and watch video content provided by a network television channel. In this regard, the processor module 210 may be operable to perform data and/or video processing operations that support playing games and/or video content reproduction.

The processor module 210 may be operable to interact with one or more of the components in the mobile communication device 200. For example, the processor module 210 may be operable to receive an output from the sensor module 240 and to determine an orientation (e.g., portrait, landscape) of the mobile communication device 200. Moreover, the processor module 210 may be operable to utilize information from the sensor module 240 to determine whether a current orientation of the mobile communication device 200 resulted from a clockwise or from a counter-clockwise rotation of the device.

The processor module 210 may be operable to determine an operating mode when running the watch-and-play application. The operating mode may be determined based on the type of device (e.g., smartphone, tablet device), on the current orientation of the device, and/or on whether the device was rotated clockwise or counter-clockwise. In some instances, the type of device may refer to the screen size and whether the screen size may support concurrent display of both video content for watching and a game for playing.

The processor module 210 may comprise one or more processors 212, . . . , 214 to perform the operations described above. The one or more processors may comprise a central processing unit (CPU) (not shown), a digital signal processor (DSP) (not shown), a graphics or video processor (not shown), or a combination thereof.

The memory module 220 may comprise suitable logic, circuitry, code, and/or interfaces that may be operable to store data corresponding to a watch-and-play application for the mobile communication device 200. The memory module 220 may be operable to store historical data related to the orientation and/or rotations of the mobile communication device 200. The memory module 220 may also be operable to store data for a rewards system used in connection with one or more games supported by the watch-and-play application.

The memory module 220 may comprise one or more memory integrated circuits (ICs) 222, . . . , 224. The memory ICs may comprise volatile and/or non-volatile memory ICs, for example.

The I/O interface module 230 may comprise suitable logic, circuitry, code, and/or interfaces that may be operable to enable user interaction with the mobile communication device 200. For example, the I/O interface module 230 may be operable to enable touch screen interaction with the mobile communication device 200. Such touch screen interaction may be utilized to support functionality of a watch-and-play application. The I/O interface module 230 may be operable to enable a user to provide inputs that may be utilized by the mobile communication device 200 in connection with the watch-and-play application.

The I/O interface module 230 may also comprise a microphone that is operable to receive audio input such as voice. The audio input may be utilized to control and/or interact with the mobile communication device 200 and/or applications (e.g., watch-and-play application) running on the mobile communication device 200. The I/O interface module 230 may also comprise one or more speakers that may be operable to output audio signals. The output audio signals may be played back when configuring, controlling and/or interacting with the mobile communication device 200. Applications running on the mobile communication device 200 may also result in the output of audio signals.

The sensor module 240 may comprise suitable logic, circuitry, code, and/or interfaces that may be operable to detect and provide information of the current orientation (e.g., portrait, landscape) of the mobile communication device 220. The sensor module 240 may also be operable to detect and provide information of rotations that occur to bring the mobile communication device 220 to its current orientation. For example, the sensor module 240 may be operable to indicate whether a clockwise or a counter-clockwise rotation occurred to bring the mobile communication device 220 to its current orientation.

The sensor module 240 may comprise one or more sensors 242, . . . , 244. The sensors may comprise one or more accelerometers (not shown) and/or one or more gyroscopes (not shown), for example. The sensor module 240 may be operable to process the readings performed by the accelerometers and/or gyroscopes to produce the orientation and/or rotation information described above.

The display module 250 may comprise suitable logic, circuitry, code, and/or interfaces that may be operable to reproduce video content and/or gaming graphics. The display module 250 may be operable to reproduce instructions corresponding to the operation of a watch-and-play application to assist a user in making selections and/or in orienting the mobile communication device 200 to operate in a desired mode. The display module 250 may comprise a display or screen (e.g., a touch screen) and may be operable to partition the screen into two portions, where one portion of the screen may be utilized to reproduce or display video content for the user to watch, while the other portion of the screen may be utilized to concurrently reproduce or display a game for playing.

The communications module 260 may comprise suitable logic, circuitry, code, and/or interfaces that may be operable to communicate with a network, such as the network 120 described above with respect to FIG. 1. In this regard, the mobile communication devices 100 and 110 described above may each comprise a communications module 260, or other like module, which may allow the devices to communicate with the network 120 via wireless links A and B, respectively.

The communications module 260 may be operable to support multiple communication protocols. For example, the communications module 260 may be operable to support wireless communication via one or more of Bluetooth, WiMax, IEEE 802.11 (802.11a/b/g/n/ac), cellular services, and mobile satellite communications, to name a few.

In operation, the mobile communication device 200 may download an application that enables watch-and-play operations. The watch-and-play application may be received via the communications module 260 and may be stored in the memory module 220. The application may then run or execute on the processor module 210. The processor module 210 may determine an operating mode of the mobile communication device 200 based on information provided by the sensor module 240.

Once the watch-and-play application is running, and based on the current operating mode of the mobile communication device 200, a user may be presented with video content for watching, or a game for playing, or both. The video content and/or the game may be displayed on the screen of the display module 250. The video content may be received by the mobile communication device 200 via the communications module 260. In this regard, the watch-and-play application may generate a request for the video content, where the request may be sent to a server via the communications module 210. The game may be selected by the user from multiple games supported by the application. User interaction or participation with the game may occur via a touch screen graphical user interface (GUI) in the display module 250, audio input and/or may be supported by the I/O interface module 230. The user interaction or participation with the game may be independent of the user consumption (e.g., watching) of the video content being displayed.

In some embodiments of the invention, the video content to be received by the mobile communication device 200 may be selected by the user. User interaction or participation for video content selection may occur via a touch screen in the display module 250 and may be supported by the I/O interface module 230.

Figure 3:
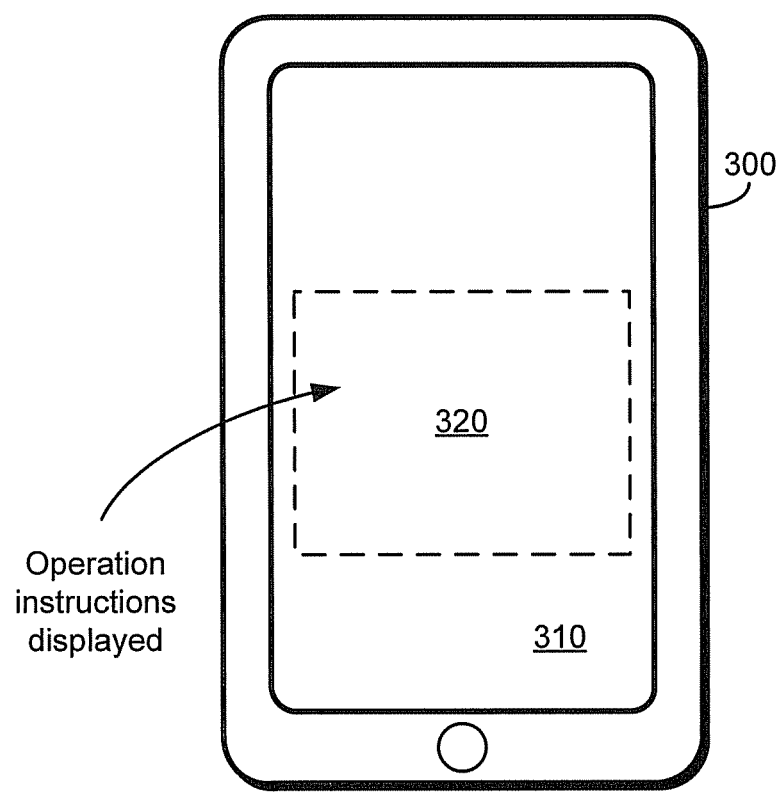
FIG. 3 is a diagram that illustrates an exemplary presentation of operation instructions in a display for a watch-and-play application, in accordance with an embodiment of the invention.

FIG. 3 is a diagram that illustrates an exemplary display of operation instructions for a watch-and-play application, in accordance with an embodiment of the invention. Referring to FIG. 3, there is shown a mobile communication device 300 that may correspond to the mobile communication device 200 described above. The mobile communication device 300 may be a smartphone or a tablet device, for example. The mobile communication device 300 may comprise a screen 310, which may be a touch screen, for example.

In operation, once the watch-and-play application is started, a portion 320 of the screen 310 may be utilized to display or present operation instructions to the user of the communication device 200. For example, the operation instructions displayed on the screen 310 may indicate to the user which device orientation corresponds to video content being displayed for watching, which device orientation corresponds to a game being provided for playing, and which device orientation may support the display of both video content and a game. Moreover, the operation instructions displayed on the screen 310 may provide instructions for game selection from the multiple games that are supported. In some embodiments of the invention, the operation instructions displayed on the screen 310 may provide instructions for the selection of video content (e.g., programs, shows, trailers, promos) that is to be displayed from a network television channel.

The operation instructions may be displayed as a single set of instructions or may be presented as multiple instructions screens. In some instances, when a rewards system is implemented in connection with the watch-and-play application, the operation instructions displayed on the screen 310 may provide instructions on how to collect rewards, points, icons, or the like, and/or how to utilize those items collected for subsequent game playing. The items collected may result from the time or duration that video content is displayed for a user to watch and/or from achieving certain milestones or goals when playing one or more of the games available through the watch-and-play application. Additional examples of a rewards system in connection with a watch-and-play application are provide below.

The operation instructions may comprise text and/or graphics to aid or assist a user in interacting with the watch-and-play application. In some embodiments of the invention, the operation instructions may be provided through a carousel or other navigation graphics that allow the user to easily make selections and/or be presented with information.

Figure 4A:
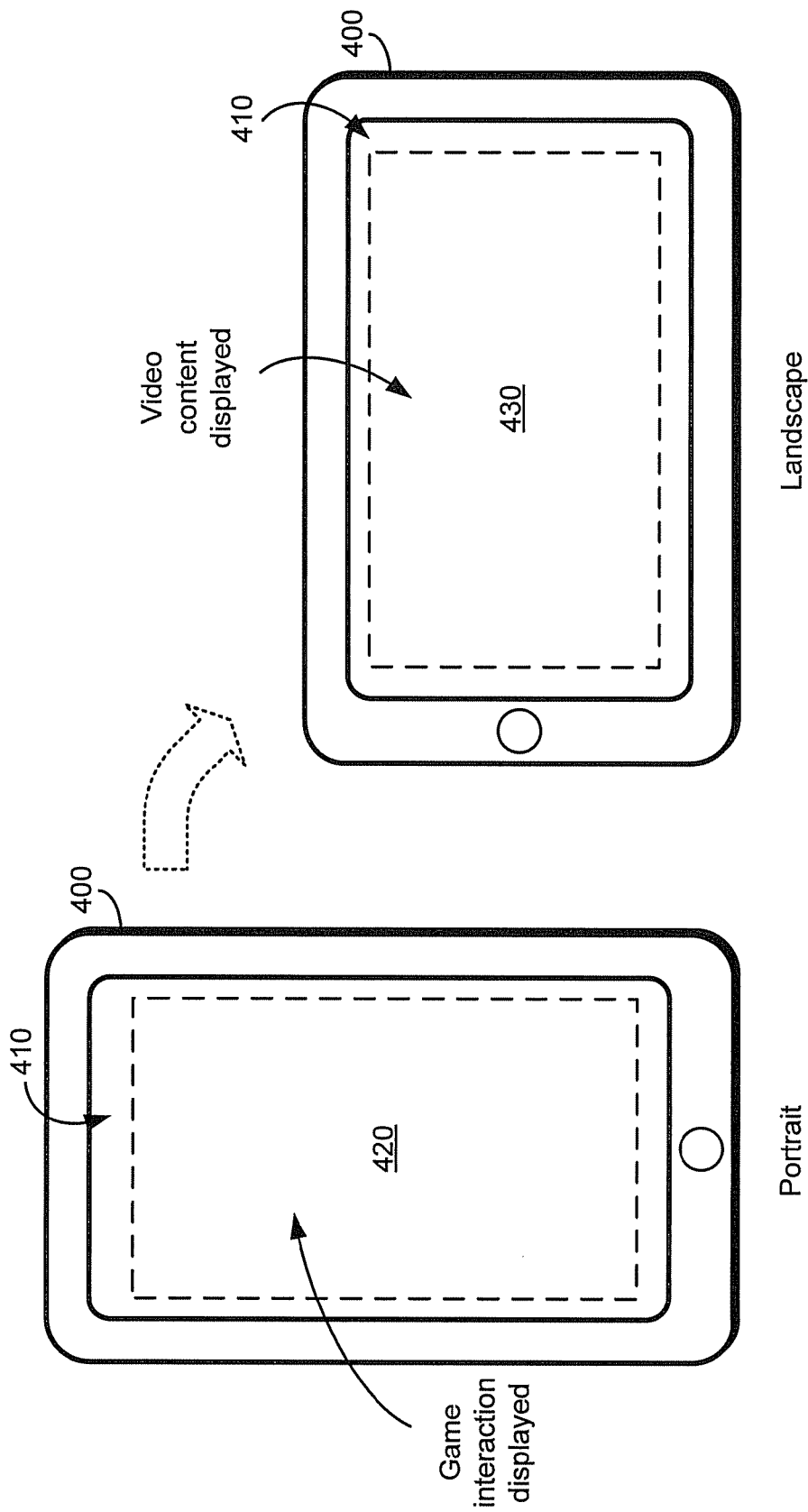
FIGS. 4A and 4B are each a diagram that illustrates exemplary operating modes for a smartphone, in accordance with embodiments of the invention.
Figure 4B:
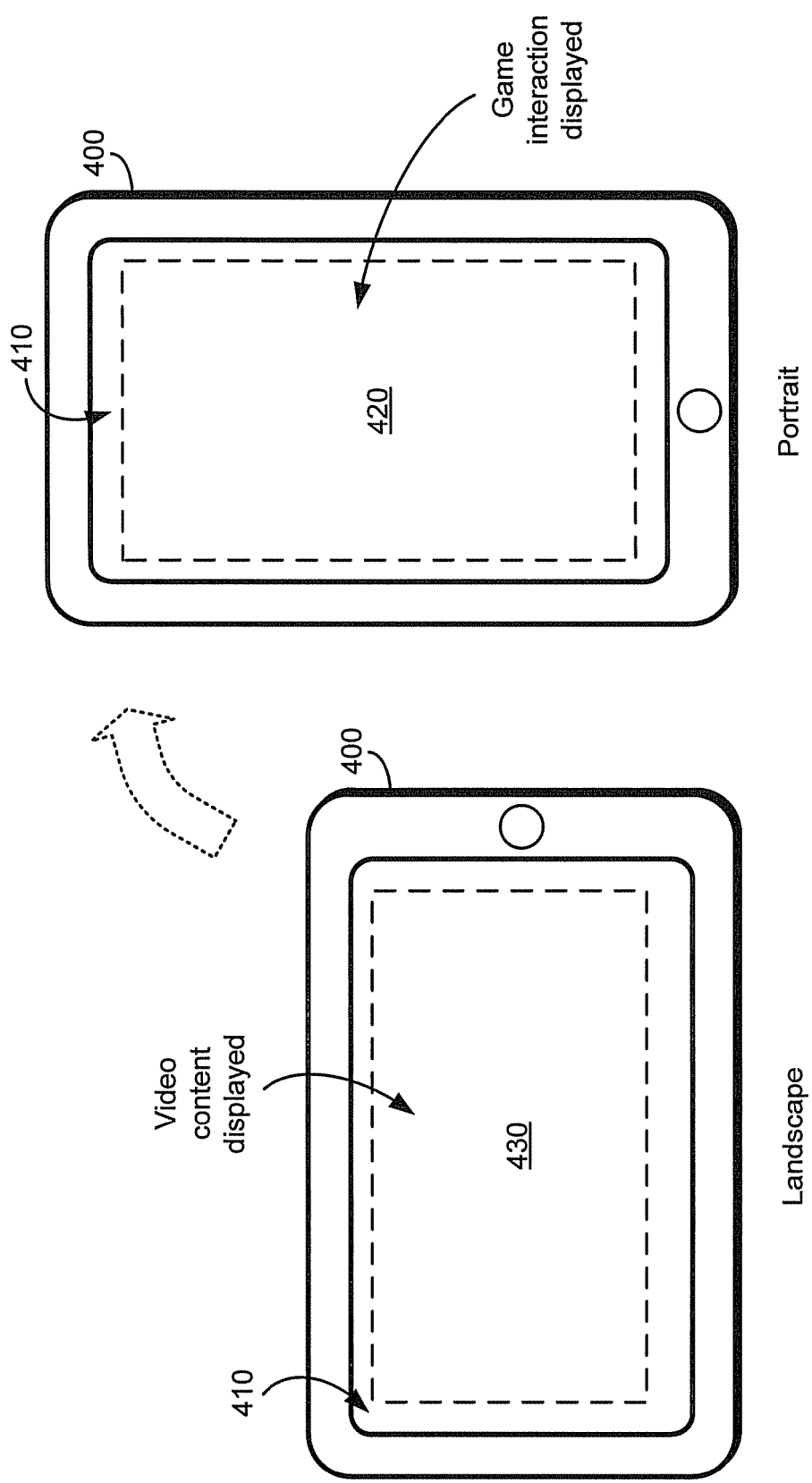

FIGS. 4A and 4B are each a diagram that illustrates exemplary operating modes for a smartphone, in accordance with embodiments of the invention. Referring to FIG. 4A, there is shown a smartphone 400 that may correspond to the mobile communication device 200 described above. When a watch-and-play application runs or executes on the smartphone 400, the smartphone 400 may operate in one of two operating modes based on its orientation.

For example, the smartphone 400 may operate in a first operating mode when in a portrait orientation. In the first operating mode, a portion 420 of a screen 410 may be utilized to display gaming graphics for user interaction. The smartphone 400 may operate in a second operating mode when in a landscape orientation. In the second operating mode, a portion 430 of the screen 410 may be utilized to display video content from a network television channel. As shown in FIG. 4A, the smartphone 400 may change from the first operating mode to the second operating mode by rotating from a portrait orientation to a landscape orientation. The rotation may be clockwise or counter-clockwise even though only a clockwise rotation is shown in FIG. 4A. Referring to FIG. 4B, the smartphone 400 is shown returning to the first operating mode from the second operating mode by a clockwise rotation. The smartphone 400 may also return to the first operating mode from the second operating mode by a counter-clockwise rotation.

In another embodiment of the invention, when the smartphone 400 is in the first operating mode (i.e., portrait orientation), the screen 410 may be utilized to display video content from the network television channel. In this embodiment of the invention, when the smartphone 400 is in the second operating mode (i.e., landscape orientation), the screen 410 may be utilized to display gaming graphics for user interaction.

Figure 5A:
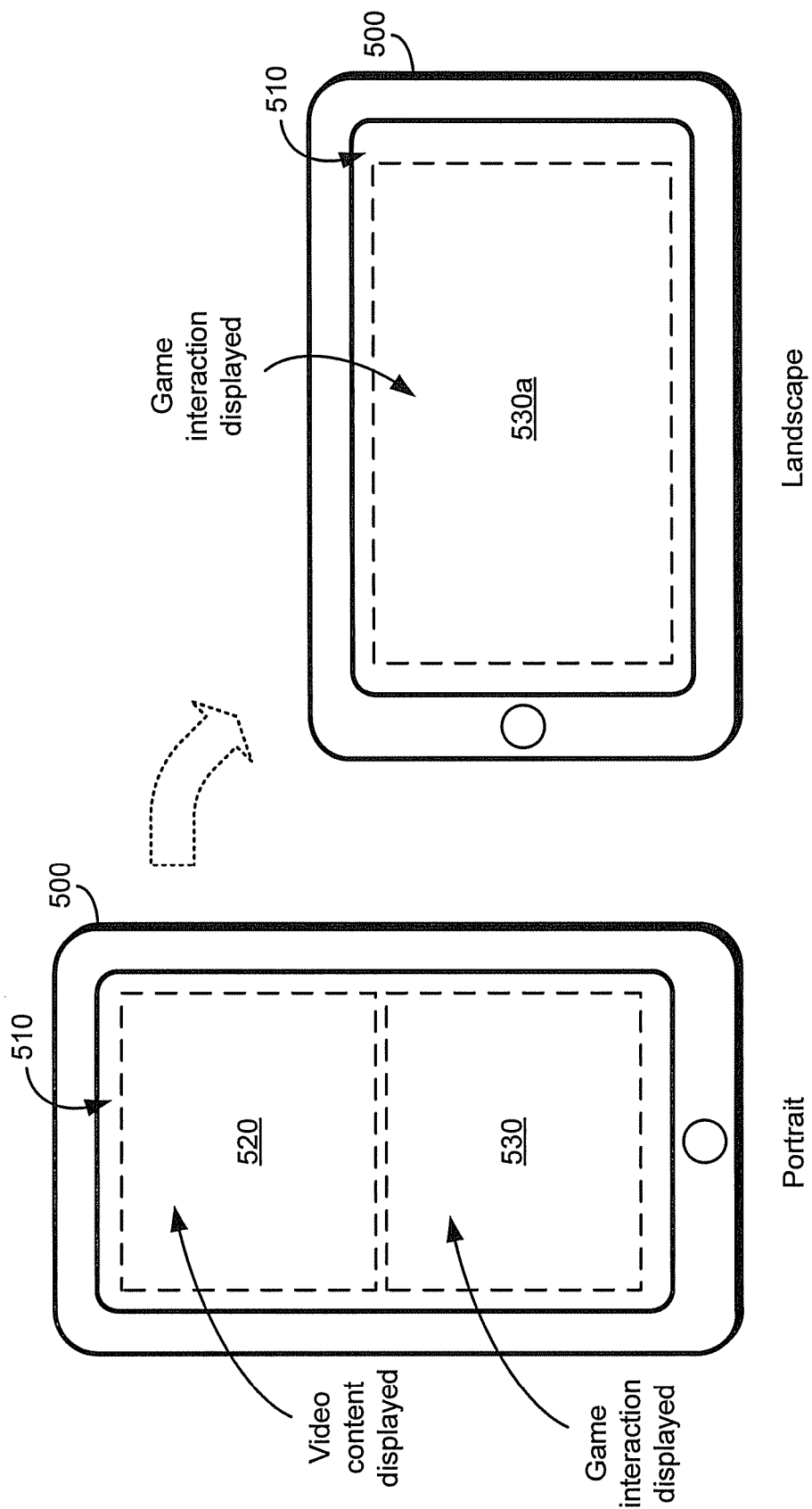
FIGS. 5A and 5B are each a diagram that illustrates exemplary operating modes for a tablet device, in accordance with embodiments of the invention.
Figure 5B:
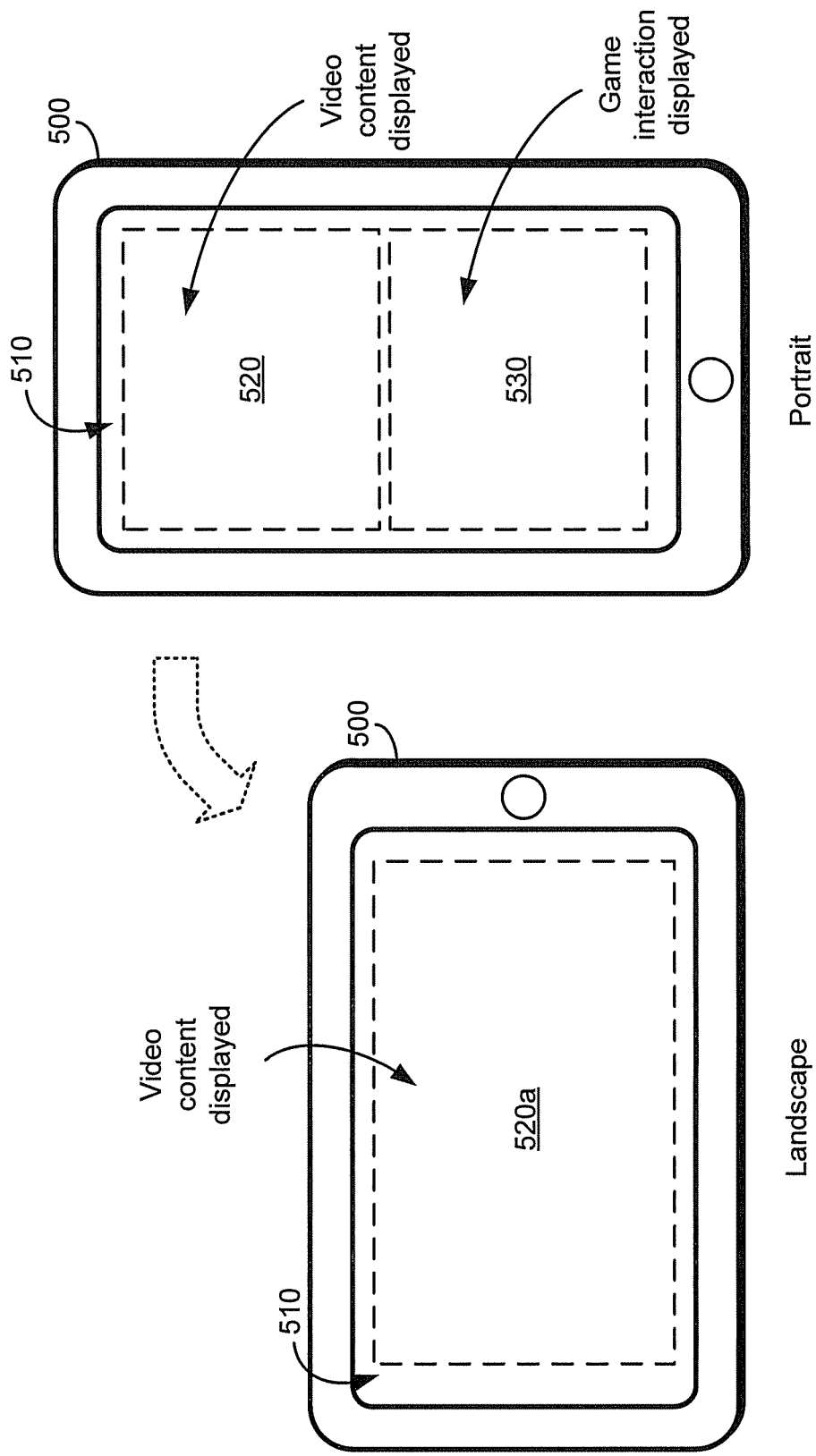

FIGS. 5A and 5B are each a diagram that illustrates exemplary operating modes for a tablet device, in accordance with embodiments of the invention. Referring to FIG. 5A, there is shown a tablet device 500 that may correspond to the mobile communication device 200 described above. When a watch-and-play application runs or executes on the tablet device 500, the tablet device 500 may operate in one of three operating modes based on its orientation.

For example, the tablet device 500 may operate in a first operating mode when in a portrait orientation. In this mode, a portion 520 of a screen 510 may be utilized to display video content from a network television channel while a portion 530 of the screen 510 may be utilized to display gaming graphics for user interaction. While the portion 520 is shown as being placed above the portion 530 in FIG. 5A, the invention need not be so limited and the portions 520 and 530 may be positioned in any one of multiple arrangements.

The tablet device 500 may operate in a second operating mode when in a landscape orientation. In this mode, a portion 530a of the screen 510 may be utilized to display gaming graphics for user interaction. As shown in FIG. 5A, the tablet device 500 may change from the first operating mode to the second operating mode by rotating clockwise and changing from a portrait orientation to a landscape orientation.

Referring to FIG. 5B, the tablet device 500 may operate in a third operating mode when in a landscape orientation. In this mode, a portion 520a of the screen 510 may be utilized to display video content from the network television channel. As shown in FIG. 5B, the tablet device 500 may change from the first operating mode to the third operating mode by rotating counter-clockwise and changing from a portrait orientation to a landscape orientation.

In another embodiment of the invention, when the tablet device 500 is in the second operating mode (i.e., landscape orientation after clockwise rotation), the screen 510 may be utilized to display gaming graphics for user interaction. In this embodiment of the invention, when the tablet device 500 is in the third operating mode (i.e., landscape orientation after counter-clockwise rotation), the screen 510 may be utilized to display video content from the network television channel.

Although, not shown in FIGS. 5A and 5B, the mobile communication device 500 may be returned to the first operating mode from either the second operating mode or the third operating mode by having the mobile communication device 500 rotated back to a portrait orientation.

Figure 6:
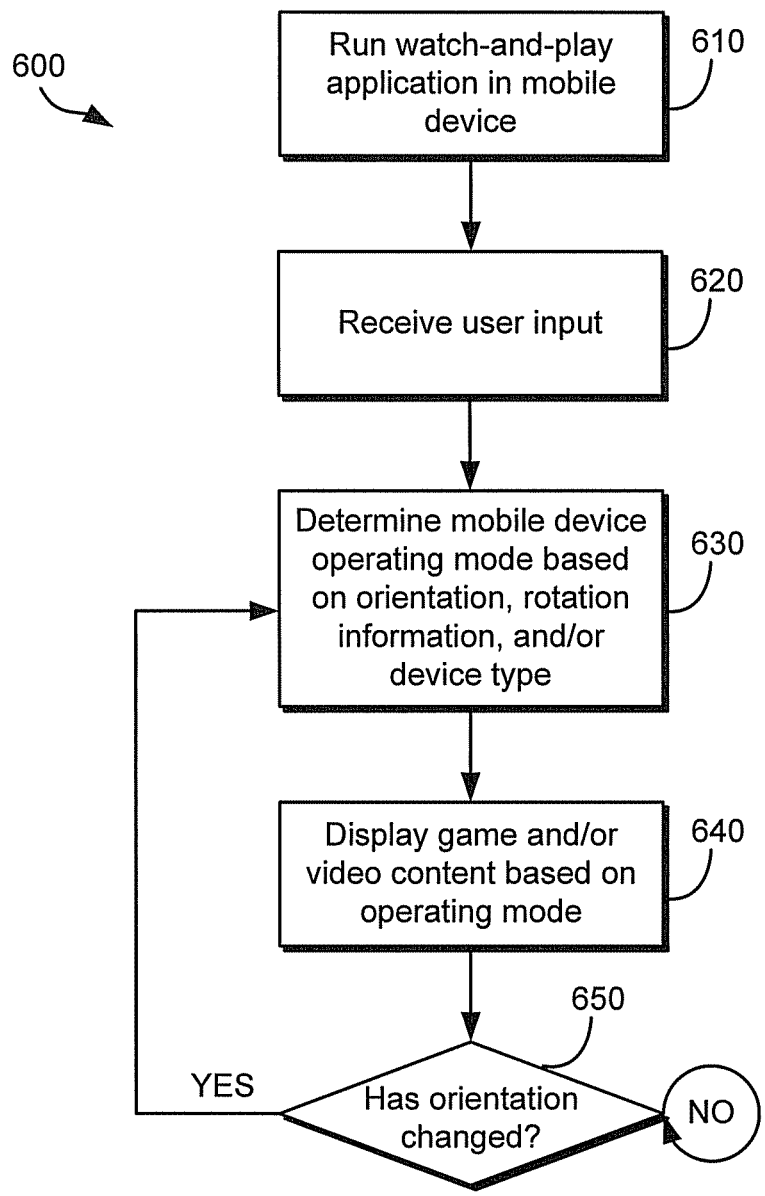
FIG. 6 is a flow chart that illustrates exemplary steps for a watch-and-play application running on a mobile communication device, in accordance with an embodiment of the invention.

FIG. 6 is a flow chart that illustrates exemplary steps for a watch-and-play application running on a mobile communication device, in accordance with an embodiment of the invention. Referring to FIG. 6, there is shown a flow chart 600 in which, at step 610, a mobile communication device, such as the mobile communication device 200, for example, may run or execute a watch-and-play application that was previously downloaded and installed. At step 620, after being presented with operation instructions such as user selections and/or navigation information, the user may provide one or more inputs to the mobile communication device. The inputs may comprise user selections regarding the game to be played and/or the video content to be watched.

At step 630, the mobile communication device may determine the operating mode based on its orientation, rotation information, and/or device type. The orientation and rotation information may be provided by sensors in the mobile communication device while information about the device type may be known and may be stored in memory. At step 640, the mobile communication device may display a game for playing and/or video content for watching based on the operating mode determined in step 630.

At step 650, the mobile communication device may determine whether its orientation has changed. When the orientation has changed, the process may proceed back to step 630. Otherwise, the process may remain at step 650 where subsequent checks may be made to determine whether a change in orientation has occurred.

Figure 7A:
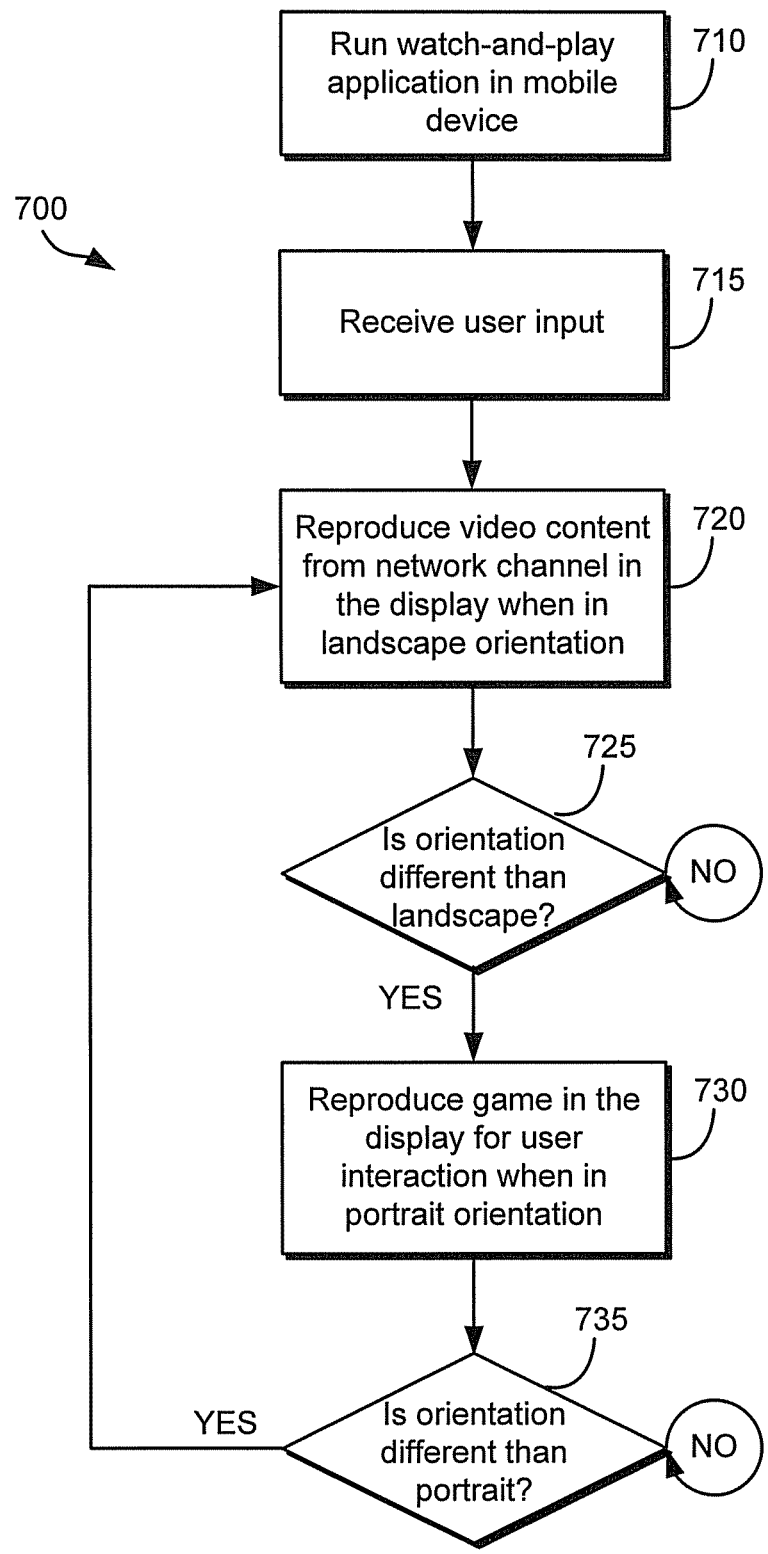
FIG. 7A is a flow chart that illustrates exemplary steps for a watch-and-play application running on a smartphone, in accordance with an embodiment of the invention.

FIG. 7A is a flow chart that illustrates exemplary steps for a watch-and-play application running on a smartphone, in accordance with an embodiment of the invention. Referring to FIG. 7A, there is shown a flow chart 700 in which, at step 710, a smartphone, such as the smartphone 100, for example, may run or execute a watch-and-play application that was previously downloaded and installed. At step 715, after being presented with operation instructions such as user selections and/or navigation information, the user may provide one or more inputs to the smartphone. The inputs may comprise user selections regarding the game to be played and/or the video content to be watched.

At step 720, when the smartphone is in an operating mode corresponding to a landscape orientation, the smartphone may display or reproduce video content from a network television channel. The video content may be provided by a server, such as the network television channel server 130 described above with respect to FIG. 1, for example. At step 725, the smartphone may determine, based on readings from built-in sensors (e.g., sensor module 240), whether the current orientation is different from a landscape orientation. That is, the smartphone may determine whether the operating mode has changed to a portrait orientation. When the orientation and, consequently, the operating mode, have changed, the process may proceed to step 730. When no change has occurred, the process may remain at step 725 where further checks may be made regarding the smartphone's orientation or operating mode.

At step 730, when the smartphone is in an operating mode corresponding to a portrait orientation, the smartphone may display or reproduce a game for user interaction. At step 735, the smartphone may determine, based on readings from built-in sensors (e.g., sensor module 240), whether the current orientation is different from a portrait orientation. That is, the smartphone may determine whether the operating mode has changed. When the orientation and, consequently, the operating mode, have changed, the process may proceed back to step 720. When no change has occurred, the process may remain at step 735 where further checks may be made regarding the smartphone's orientation or operating mode.

Figure 7B:
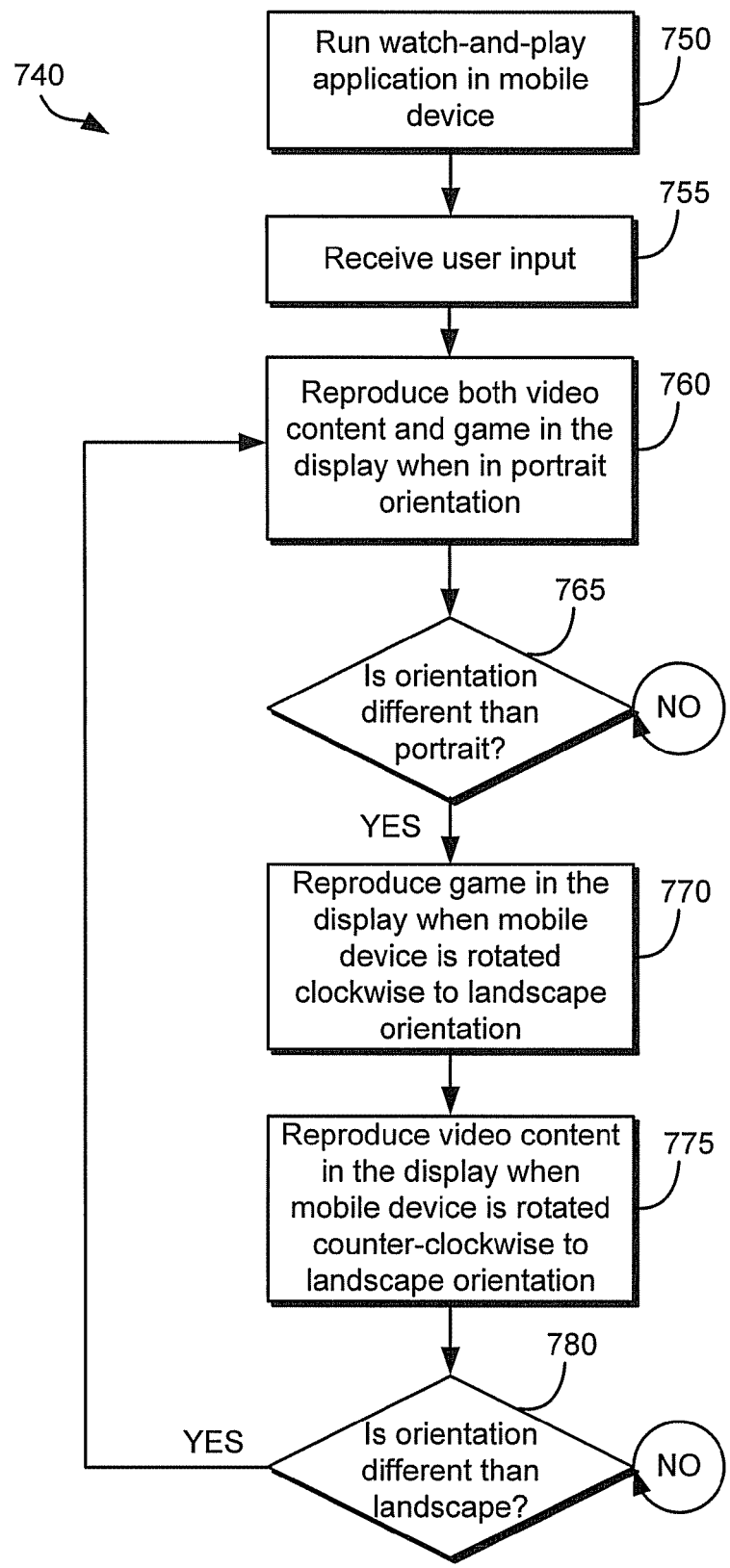
FIG. 7B is a flow chart that illustrates exemplary steps for a watch-and-play application running on a tablet device, in accordance with an embodiment of the invention.

FIG. 7B is a flow chart that illustrates exemplary steps for a watch-and-play application running on a tablet device, in accordance with an embodiment of the invention. Referring to FIG. 7A, there is shown a flow chart 740 in which, at step 750, a tablet device, such as the tablet device 110, for example, may run or execute a watch-and-play application that was previously downloaded and installed. At step 755, after being presented with operation instructions such as user selections and/or navigation information, the user may provide one or more inputs to the tablet device. The inputs may comprise user selections regarding the game to be played and/or the video content to be watched.

At step 760, when the tablet device is in an operating mode corresponding to a portrait orientation, the tablet device may display or reproduce both video content from a network television channel and a game for user interaction. At step 765, the tablet device may determine, based on readings from built-in sensors (e.g., sensor module 240), whether the current orientation is different from a portrait orientation. That is, the tablet device may determine whether the operating mode has changed to one of the operating modes that correspond to a landscape orientation. When the orientation and, consequently, the operating mode, have changed, the process may proceed to steps 770 and 775. When no change has occurred, the process may remain at step 765 where further checks may be made regarding the tablet device's orientation or operating mode.

At step 770, when the tablet device is in an operating mode corresponding to a landscape orientation and the device was rotated clockwise to achieve that orientation, the tablet device may display or reproduce a game for user interaction. On the other hand, at step 775, when the tablet device is in an operating mode corresponding to a landscape orientation and the device was rotated counter-clockwise to achieve that orientation, the tablet device may display or reproduce video content from a network television channel.

At step 780, the tablet device may determine, based on readings from built-in sensors (e.g., sensor module 240), whether the current orientation is different from a landscape orientation. That is, the tablet device may determine whether the operating mode has changed. When the orientation and, consequently, the operating mode, have changed, the process may proceed back to step 760. When no change has occurred, the process may remain at step 780 where further checks may be made regarding the tablet device's orientation or operating mode.

In another embodiment of the invention, at step 770, when the tablet device is in an operating mode corresponding to a landscape orientation and the device was rotated counter-clockwise to achieve that orientation, the tablet device may display or reproduce a game for user interaction. In this embodiment of the invention, at step 775, when the tablet device is in an operating mode corresponding to a landscape orientation and the device was rotated clockwise to achieve that orientation, the tablet device may display or reproduce video content from a network television channel.

Figure 8:
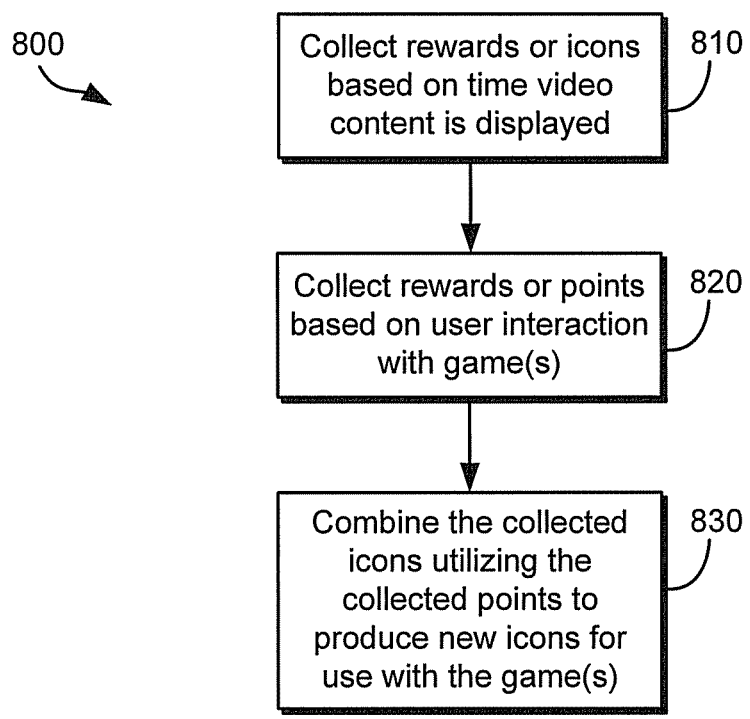
FIG. 8 is a flow chart that illustrates exemplary steps for a rewards system used in a watch-and-play application, in accordance with an embodiment of the invention.

FIG. 8 is a flow chart that illustrates exemplary steps for a rewards system used in a watch-and-play application, in accordance with an embodiment of the invention. Referring to FIG. 8, there is shown a flow chart 800 in which, at step 810, a mobile communication device running a watch-and-play application may collect rewards or icons based on the amount of time that video content is displayed or reproduced by the mobile communication device. The amount of time may correspond to a total amount of time video content has been displayed, or to a total amount of time a particular program or show has been displayed, or to a total amount of time video content has been displayed in a current session, for example. The amount of time information and/or the icons that are collected may be stored in local memory in the mobile communication device, such as the memory module 220 described above with respect to FIG. 2.

At step 820, the mobile communication device may collect rewards or points based on user interaction with one or more of the games supported by the watch-and-play application. The points may correspond to the points received for playing a particular game, or the points received for playing one or more games during a session, or the total amount of points received for playing the various games supported by the watch-and-play application, for example. The points information that is collected may be stored in local memory in the mobile communication device.

At step 830, the mobile communication device may combine the icons collected by utilizing the points collected to produce new or different icons that may be utilized with one or more of the games supported by the watch-and-play application.

In another embodiment of the invention, collected information (e.g., icons, points) may be stored remotely. In this regard, the mobile communication device may communicate the collected information to a remote storage device.

In an example of the process described above with respect to FIG. 8, a user may obtain an icon of a rabbit and another icon of a carrot as a result of watching programming from a children's television network (e.g., Cartoon Network) through the watch-and-play application. The user may also obtain a certain number of points from playing one or more of the games supported by the application. The number of points may be sufficient to allow the user to combine or mix the icons to produce a new icon such as Bugs Bunny icon, for example. This new icon may then be utilized when playing one or more of the games supported by the watch-and-play applications to perform interactions that were not previously allowed but that are now available to the user because of the new icon.

In one embodiment of the invention, a method may be provided in which, in a mobile communication device (e.g., mobile communication device 200) comprising a display (e.g., display module 250) and one or more sensors (e.g., sensor module 240), video content corresponding to a network television channel may be received, an orientation of the mobile communication device may be determined based on an output from the one or more sensors, and one or both of the received video content and a game selected from multiple games may be reproduced on the display. When the mobile communication device is a tablet device (e.g., mobile communication device 110) and the orientation is a portrait orientation, both the selected game and the video content may be reproduced on the display.

The mobile communication device may be operable to detect when the orientation of the mobile communication device has changed from a portrait orientation to a landscape orientation by rotation of the mobile communication device in a clockwise direction. In some embodiments of the invention, the selected game may be reproduced on the display without the received video content. In other embodiments of the invention, the video content may be reproduced without the selected game.

The mobile communication device may be operable to detect when the orientation of the mobile communication device has changed from a portrait orientation to a landscape orientation by rotation of the mobile communication device in a counter-clockwise direction. In some embodiments of the invention, the selected game may be reproduced on the display without the received video content. In other embodiments of the invention, the video content may be reproduced without the selected game.

The mobile communication device may be operable to reproduce on the display, based on the determined orientation of the mobile communication device, one of the received video content and the selected game. The mobile communication device may detect that its orientation has changed, where the change may be from a portrait orientation to a landscape orientation or from a landscape orientation to a portrait orientation. When the change is detected, the mobile communication device may reproduce on the display the one of the received video content and the selected game not previously reproduced.

The mobile communication device may be operable to generate one or more operation instructions, to reproduce the generated operation instructions on the display, and to select the game from the multiple games based on an input received from a user, where the input provided by the user is in response to the reproduction of the generated operation instructions. The generated operation instructions may comprise orientation and/or rotation instructions to reproduce on the display one or both of the received video content and the selected game, where the orientation and/or rotation instructions may be based on the type of mobile communication device (e.g., smartphone, tablet device).

The mobile communication device may be operable to collect a first type of reward corresponding to the amount of time the received video content is reproduced on the display, to collect a second type of reward corresponding to user interaction with the selected game, and to combine the collected first type of reward with the collected second type of reward to produce a third type of reward for subsequent user interaction with the selected game.

While various embodiments of the invention have been described in connection with smartphones and tablet devices, the invention need not be so limited and other devices may also be utilized. Moreover, although various references are made to portrait and landscape orientations, the invention need not be so limited and other orientations may be supported in connection with different operating modes. Moreover, the portrait orientation described above may comprise those instances when the mobile communication device is positioned in a manner that is approximately or close to a portrait orientation. Similarly, the landscape orientation described above may comprise those instances when the mobile communication device is positioned in a manner that is approximately or close to a landscape orientation.

Although the examples described above illustrate a smartphone operating in one of two modes and a tablet device operating in one of three modes, the invention need not be so limited. For example, a smartphone, such as the smartphone 400, may be operated in any one of the three modes described above in connection with the tablet device 500. That is, the three modes of operation described with respect to the tablet device 500 may also be utilized by a wireless device other than a tablet device. Similarly, a tablet device, such as the tablet device 500, for example, may be operated in any one of the two modes described above in connection with the smartphone 400. That is, the two modes of operation described with respect to the smartphone 400 may also be utilized by a wireless device other than a smartphone.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for watching content and playing games in a mobile communication device.

Accordingly, the present disclosure may be realized in hardware, software, or a combination of hardware and software. The present disclosure may be realized in a centralized fashion in at least one computer system; or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method, comprising:
    in a mobile communication device comprising a display, a hardware communication module, a hardware processor, and a hardware sensor module comprising one or more sensors:
        receiving, via the hardware communication module from a network channel server, video content corresponding to a network television channel;
        determining, by the hardware processor, based on an output from the one or more sensors, an orientation of the mobile communication device;
        determining, by the hardware processor, an operating mode of the mobile communication device when running a particular application, wherein the determination is based on a type of the mobile communication device, a screen size of the display, and capability of the display to support concurrent display of video content and playing of a game;
        reproducing, by the hardware processor, for concurrent presentation on the display, based on the determined orientation and determined mode of the mobile communication device, the received video content and the game selected from a plurality of games;
        collecting icons based on an amount of time that video content is displayed or reproduced by the mobile communication device; and
        mixing the collected icons to produce new icons to be utilized with one or more of the plurality of games, wherein the new icons are utilized to perform interactions that were not previously allowed but are now available because of the new icons.

2. The method of claim 1, comprising reproducing on the display both the selected game and the video content when the mobile communication device is a tablet device and the orientation of the mobile communication device is a portrait orientation.

3. The method of claim 2, comprising:
    detecting that the orientation of the mobile communication device has changed from a portrait orientation to a landscape orientation by rotation of the mobile communication device in a clockwise direction; and
    reproducing on the display the selected game without the received video content.

4. The method of claim 2, comprising:
    detecting that the orientation of the mobile communication device has changed from a portrait orientation to a landscape orientation by rotation of the mobile communication device in a counter-clockwise direction; and
    reproducing on the display the selected game without the received video content.

5. The method of claim 2, comprising:
    detecting that the orientation of the mobile communication device has changed from a portrait orientation to a landscape orientation by rotation of the mobile communication device in a clockwise direction; and
    reproducing on the display the received video content without the selected game.

6. The method of claim 2, comprising:
    detecting that the orientation of the mobile communication device has changed from a portrait orientation to a landscape orientation by rotation of the mobile communication device in a counter-clockwise direction; and
    reproducing on the display the received video content without the selected game.

7. The method of claim 1, comprising:
    reproducing on the display, based on the determined orientation of the mobile communication device, one of the received video content and the selected game;
    detecting that the orientation of the mobile communication device has changed, the change in orientation being from a portrait orientation to a landscape orientation or from a landscape orientation to a portrait orientation; and
    reproducing on the display the one of the received video content and the selected game not previously reproduced.

8. The method of claim 1, comprising:
    generating one or more operation instructions;
    reproducing the generated operation instructions on the display; and
    selecting the game from the plurality of games corresponding to the network television channel based on an input received from a user, the input being provided by the user in response to the reproduction of the generated operation instructions.

9. The method of claim 8, wherein the generated operation instructions comprise orientation and/or rotation instructions to reproduce on the display one or both of the received video content and the selected game, the orientation and/or rotation instructions being based on the type of mobile communication device.

10. The method of claim 1, comprising:
    collecting a first type of reward corresponding to the amount of time the received video content is reproduced on the display;
    collecting a second type of reward corresponding to user interaction with the selected game; and combining the collected first type of reward with the collected second type of reward to produce a third type of reward, wherein the third type of reward is utilized for subsequent user interaction with the selected game.

11. The method according to claim 1, comprising collecting points for combining the collected icons.

12. A system, comprising:
a mobile communication device comprising a display, a hardware communication module, a hardware processor, and a hardware sensor module comprising one or more sensors, wherein:
the hardware communication module receives from a network communication server, video content corresponding to a network television channel;
the hardware processor determines, based on an output from the one or more sensors, an orientation of the mobile communication device;
the hardware processor determines an operating mode of the mobile communication device when running a particular application, wherein the determination is based on a type of the mobile communication device, a screen size of the display, and capability of the display to support concurrent display of video content and playing of a game;
the hardware processor reproduces, for concurrent presentation on the display, based on the determined orientation and determined mode of the mobile communication device, the received video content and the game selected from a plurality of games;
the hardware processor collects icons based on an amount of time that video content is displayed or reproduced by the mobile communication device; and
the hardware processor mixes the collected icons to produce new icons to be utilized with one or more of the plurality of dames, wherein the new icons are utilized to perform interactions that were not previously allowed but are now available because of the new icons.

13. The system of claim 12, wherein the mobile communication device is operable to reproduce on the display both the selected game and the video content when the mobile communication device is a tablet device and the orientation of the mobile communication device is a portrait orientation.

14. The system of claim 13, wherein the mobile communication device is operable to:
detect that the orientation of the mobile communication device has changed from a portrait orientation to a landscape orientation by rotation of the mobile communication device in a clockwise direction; and
reproduce on the display the selected game without the received video content.

15. The system of claim 13, wherein the mobile communication device is operable to:
detect that the orientation of the mobile communication device has changed from a portrait orientation to a landscape orientation by rotation of the mobile communication device in a counter-clockwise direction; and
reproduce on the display the selected game without the received video content.

16. The system of claim 13, wherein the mobile communication device is operable to:
detect that the orientation of the mobile communication device has changed from a portrait orientation to a landscape orientation by rotation of the mobile communication device in a clockwise direction; and
reproduce on the display the received video content without the selected game.

17. The system of claim 13, wherein the mobile communication device is operable to:
detect that the orientation of the mobile communication device has changed from a portrait orientation to a landscape orientation by rotation of the mobile communication device in a counter-clockwise direction; and
reproduce on the display the received video content without the selected game.

18. The system of claim 12, wherein the mobile communication device is operable to:
reproduce on the display, based on the determined orientation of the mobile communication device, one of the received video content and the selected game;
detect that the orientation of the mobile communication device has changed, the change in orientation being from a portrait orientation to a landscape orientation or from a landscape orientation to a portrait orientation; and
reproduce on the display the one of the received video content and the selected game not previously reproduced.

19. The system of claim 12, wherein the mobile communication device is operable to:
generate one or more operation instructions;
reproduce the generated operation instructions on the display; and
select the game from the plurality of games corresponding to the network television channel based on an input received from a user, the input being provided by the user in response to the reproduction of the generated operation instructions.

20. The system of claim 19, wherein the generated operation instructions comprise orientation and/or rotation instructions to reproduce on the display one or both of the received video content and the selected game, the orientation and/or rotation instructions being based on the type of mobile communication device.

21. The system of claim 12, wherein the mobile communication device is operable to:
collect a first type of reward corresponding to the amount of time the received video content is reproduced on the display;
collect a second type of reward corresponding to user interaction with the selected game; and
combine the collected first type of reward and the collected second type of reward to produce a third type of reward, wherein the third type of reward is utilized for subsequent user interaction with the selected game.

22. The system according to claim 12, comprising collecting points for combining the collected icons.

23. A non-transitory computer readable media having stored thereon a computer program having at least one code section for processing data, the at least one code section being executable by a computer to cause the computer to perform steps comprising:
in a mobile communication device comprising a display, a hardware communication module, a hardware processor, and a hardware sensor module comprising one or more sensors:
receiving, via the hardware communication module from a network channel server, video content corresponding to a network television channel;

determining, by the hardware processor, based on an output from the one or more sensors, an orientation of the mobile communication device;

determining, by the hardware processor, an operating mode of the mobile communication device when running a particular application, wherein the determination is based on a type of the mobile communication device, a screen size of the display, and capability of the display to support concurrent display of video content and playing of a game;

reproducing, by the hardware processor, for concurrent presentation on the display, based on the determined orientation and determined mode of the mobile communication device, the received video content and the game selected from a plurality of games;

collecting icons based on an amount of time that video content is displayed or reproduced by the mobile communication device; and mixing the collected icons to produce new icons to be utilized with one or more of the plurality of games, wherein the new icons are utilized to perform interactions that were not previously allowed but are now available because of the new icons.

24. The non-transitory computer readable media of claim 23, wherein the at least one code section comprises code for reproducing on the display both the selected game and the video content when the mobile communication device is a tablet device and the orientation of the mobile communication device is a portrait orientation.

25. The non-transitory computer readable media of claim 24, wherein the at least one code section comprises code for:
detecting that the orientation of the mobile communication device has changed from a portrait orientation to a landscape orientation by rotation of the mobile communication device in a clockwise direction; and
reproducing on the display the selected game without the received video content.

26. The non-transitory computer readable media of claim 24, wherein the at least one code section comprises code for:
detecting that the orientation of the mobile communication device has changed from a portrait orientation to a landscape orientation by rotation of the mobile communication device in a counter-clockwise direction; and
reproducing on the display the selected game without the received video content.

27. The non-transitory computer readable media of claim 24, wherein the at least one code section comprises code for:
detecting that the orientation of the mobile communication device has changed from a portrait orientation to a landscape orientation by rotation of the mobile communication device in a clockwise direction; and
reproducing on the display the received video content without the selected game.

28. The non-transitory computer readable media of claim 24, wherein the at least one code section comprises code for:
detecting that the orientation of the mobile communication device has changed from a portrait orientation to a landscape orientation by rotation of the mobile communication device in a counter-clockwise direction; and
reproducing on the display the received video content without the selected game.

29. The non-transitory computer readable media of claim 23, wherein the at least one code section comprises code for:
reproducing on the display, based on the determined orientation of the mobile communication device, one of the received video content and the selected game;
detecting that the orientation of the mobile communication device has changed, the change in orientation being from a portrait orientation to a landscape orientation or from a landscape orientation to a portrait orientation; and
reproducing on the display the one of the received video content and the selected game not previously reproduced.

30. The non-transitory computer readable media of claim 23, wherein the at least one code section comprises code for:
generating one or more operation instructions;
reproducing the generated operation instructions on the display; and
selecting the game from the plurality of games corresponding to the network television channel based on an input received from a user, the input being provided by the user in response to the reproduction of the generated operation instructions.

31. The non-transitory computer readable media of claim 30, wherein the generated operation instructions comprise orientation and/or rotation instructions to reproduce on the display one or both of the received video content and the selected game, the orientation and/or rotation instructions being based on the type of mobile communication device.

32. The non-transitory computer readable media of claim 23, wherein the at least one code section comprises code for:
collecting a first type of reward corresponding to the amount of time the received video content is reproduced on the display;
collecting a second type of reward corresponding to user interaction with the selected game; and
combining the collected first type of reward with the collected second type of reward to produce a third type of reward, wherein the third type of reward is utilized for subsequent user interaction with the selected game.

33. The non-transitory computer readable medium according to claim 23, wherein the at least one code section comprises code for collecting points for combining the collected icons.

34. A method, comprising:
determining, by a hardware processor in a mobile communication device, based on a type of the mobile communication device, a screen size of a display of the mobile communication device, and capability of the display to support concurrent display of video content and playing of a game when the display is partitioned into a first portion for displaying the video content and a second portion for playing the game, an operating mode of the mobile communication device when running an application that enables displaying of the video content and the playing of the game by the mobile communication device;
reproducing instructions corresponding to operation of the running application to assist a user in making selections and in orienting the mobile communication device;
concurrently presenting on the display, based on the determined orientation and determined mode of the mobile communication device, the received video content and the game selected from a plurality of games based on the selections;
collecting icons based on an amount of time that video content is displayed or reproduced by the mobile communication device; and mixing the collected icons to produce new icons to be utilized with one or more of the plurality of games, wherein the new icons are utilized to perform interactions that were not previously allowed but are now available because of the new icons.

35. The method according to claim 34, comprising collecting points for combining the collected icons.

36. A system, comprising:

a hardware processor in a mobile communication device that determines based on a type of the mobile communication device, a screen size of a display of the mobile communication device, and capability of the display to support concurrent display of video content and playing of a game when the display is partitioned into a first portion for displaying the video content and a second portion for playing the game, an operating mode of the mobile communication device when running an application that enables displaying of the video content and the playing of the game by the mobile communication device;

the display reproduces instructions corresponding to operation of the running application to assist a user in making selections and in orienting the mobile communication device;

the display concurrently presents, based on the determined orientation and determined mode of the mobile communication device, the received video content and the game selected from a plurality of games based on the selections;

the hardware processor collects icons based on an amount of time that video content is displayed or reproduced by the mobile communication device; and the hardware processor mixes the collected icons to produce new icons to be utilized with one or more of the plurality of games, wherein the new icons are utilized to perform interactions that were not previously allowed but are now available because of the new icons.

37. The system according to claim 36, comprising collecting points for combining the collected icons.

38. A non-transitory computer readable medium, comprising:

code for determining, by a hardware processor in a mobile communication device, based on a type of the mobile communication device, a screen size of a display of the mobile communication device, and capability of the display to support concurrent display of video content and playing of a game when the display is partitioned into a first portion for displaying the video content and a second portion for playing the game, an operating mode of the mobile communication device when running an application that enables displaying of the video content and the playing of the game by the mobile communication device;

code for reproducing instructions corresponding to operation of the running application to assist a user in making selections and in orienting the mobile communication device;

code for concurrently presenting on the display, based on the determined orientation and determined mode of the mobile communication device, the received video content and the game selected from a plurality of games based on the selections;

code for collecting icons based on an amount of time that video content is displayed or reproduced by the mobile communication device; and code for mixing the collected icons to produce new icons to be utilized with one or more of the plurality of games, wherein the new icons are utilized to perform interactions that were not previously allowed but are now available because of the new icons.

39. The non-transitory computer readable medium according to claim 38, comprising code for collecting points for combining the collected icons.

* * * * *